(12) United States Patent
Yang et al.

(10) Patent No.: US 12,526,816 B2
(45) Date of Patent: Jan. 13, 2026

(54) INFORMATION DETERMINATION METHOD AND APPARATUS, DEVICE, AND STORAGE MEDIUM

(71) Applicant: ZTE Corporation, Shenzhen (CN)

(72) Inventors: Weiwei Yang, Shenzhen (CN); Bo Dai, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 420 days.

(21) Appl. No.: 18/030,094

(22) PCT Filed: Oct. 11, 2021

(86) PCT No.: PCT/CN2021/122949
§ 371 (c)(1),
(2) Date: Apr. 4, 2023

(87) PCT Pub. No.: WO2022/078270
PCT Pub. Date: Apr. 21, 2022

(65) Prior Publication Data
US 2023/0371040 A1  Nov. 16, 2023

(30) Foreign Application Priority Data
Oct. 14, 2020 (CN) .......................... 202011098118.4

(51) Int. Cl.
H04W 72/232 (2023.01)
H04L 1/1812 (2023.01)
H04L 5/00 (2006.01)

(52) U.S. Cl.
CPC ......... *H04W 72/232* (2023.01); *H04L 1/1812* (2013.01); *H04L 5/0055* (2013.01)

(58) Field of Classification Search
CPC ... H04L 1/1812; H04L 1/1822; H04L 1/1854; H04L 1/1864; H04L 1/1887;
(Continued)

(56) References Cited

U.S. PATENT DOCUMENTS 10,306,441 B2 * 5/2019 Alvarino ............... H04L 5/0048
10,887,906 B2 * 1/2021 Ang ....................... H04L 5/0051
(Continued)

FOREIGN PATENT DOCUMENTS

CN       107911869 A        4/2018
CN       110720245 A  *     1/2020   ............ H04W 56/00
(Continued)

OTHER PUBLICATIONS

European Search Report for corresponding application EP21879315; Report dated Jul. 18, 2024.
(Continued)

*Primary Examiner* — Eric Nowlin
(74) *Attorney, Agent, or Firm* — CANTOR COLBURN LLP

(57) ABSTRACT

Provided are an information determination method and apparatus, a device, and a storage medium. The information determination method is applied to a first node and includes the following: detecting a machine-type communication physical downlink control channel (MPDCCH) on a first subframe, where the MPDCCH carries downlink control information (DCI), and the DCI includes a signaling field indicating a value of a physical downlink shared channel (PDSCH) scheduling delay; and determining a second subframe of PDSCH transmission based on the value of the PDSCH scheduling delay.

20 Claims, 4 Drawing Sheets

(58) Field of Classification Search
CPC ... H04L 5/0044; H04L 5/0053; H04L 5/0055; H04W 72/23; H04W 72/231; H04W 72/232
See application file for complete search history.

(56) References Cited

U.S. PATENT DOCUMENTS

| | | | | |
|---|---|---|---|---|
| 11,101,921 | B2 * | 8/2021 | Li | H04B 1/50 |
| 11,184,908 | B2 * | 11/2021 | Park | H04L 27/26025 |
| 11,317,365 | B2 * | 4/2022 | Yan | H04W 74/006 |
| 11,363,626 | B2 * | 6/2022 | Zhou | H04L 5/0055 |
| 11,382,118 | B2 * | 7/2022 | Ang | H04W 72/23 |
| 11,399,364 | B2 * | 7/2022 | Sun | H04L 1/1887 |
| 11,516,789 | B2 * | 11/2022 | Han | H04L 27/2657 |
| 11,617,190 | B2 * | 3/2023 | Golitschek Edler von Elbwart | H04W 72/1215 370/329 |
| 11,778,607 | B2 * | 10/2023 | Bhatoolaul | H04W 72/1268 370/336 |
| 11,950,229 | B2 * | 4/2024 | Ang | H04W 72/23 |
| 12,016,039 | B2 * | 6/2024 | Zhou | H04L 1/189 |
| 12,058,677 | B2 * | 8/2024 | Yang | H04L 5/0053 |
| 12,114,327 | B2 * | 10/2024 | Sun | H04L 1/1887 |
| 12,328,740 | B2 * | 6/2025 | Han | H04L 5/0028 |
| 2018/0014143 | A1 | 1/2018 | Rico Alvarino | H04W 4/70 |
| 2018/0097606 | A1 | 4/2018 | Toledano et al. | |
| 2018/0159655 | A1 * | 6/2018 | Papasakellariou | H04L 1/1819 |
| 2018/0255542 | A1 * | 9/2018 | Seo | H04W 72/21 |
| 2018/0279274 | A1 * | 9/2018 | Sun | H04W 52/38 |
| 2019/0208538 | A1 | 7/2019 | Lee et al. | |
| 2019/0320306 | A1 | 10/2019 | Urabayashi et al. | |
| 2020/0107345 | A1 * | 4/2020 | Ang | H04W 72/1273 |
| 2020/0196337 | A1 * | 6/2020 | Ang | H04W 25/0226 |
| 2020/0221481 | A1 * | 7/2020 | Park | H04W 72/0466 |
| 2020/0236635 | A1 * | 7/2020 | Yan | H04L 5/14 |
| 2021/0076449 | A1 * | 3/2021 | Tirucherai Muralidharan | H04W 52/0245 |
| 2021/0219329 | A1 * | 7/2021 | Zhou | H04L 1/1819 |
| 2021/0321435 | A1 * | 10/2021 | Golitschek Edler von Elbwart | H04W 72/1268 |
| 2022/0322386 | A1 * | 10/2022 | Bhatoolaul | H04W 72/23 |
| 2022/0330302 | A1 * | 10/2022 | Ang | H04W 72/23 |
| 2022/0330312 | A1 * | 10/2022 | Zhou | H04L 1/1819 |
| 2022/0361157 | A1 * | 11/2022 | Sun | H04L 1/1864 |
| 2022/0400506 | A1 * | 12/2022 | Yang | H04L 5/0055 |
| 2023/0089890 | A1 * | 3/2023 | Han | H04L 5/0028 370/329 |
| 2023/0239873 | A1 * | 7/2023 | Zhang | H04L 5/0055 370/329 |
| 2023/0318798 | A1 * | 10/2023 | Su | H04W 72/54 370/329 |
| 2023/0354278 | A1 * | 11/2023 | Qu | H04W 72/232 |
| 2023/0371040 | A1 * | 11/2023 | Yang | H04L 1/1887 |
| 2024/0205934 | A1 * | 6/2024 | Zhou | H04L 1/1822 |
| 2024/0397524 | A1 * | 11/2024 | Zhang | H04W 72/232 |

FOREIGN PATENT DOCUMENTS

| | | | | |
|---|---|---|---|---|
| CN | 110830184 | A * | 2/2020 | H04L 1/1812 |
| CN | 110831229 | A | 2/2020 | |
| CN | 112511280 | A * | 3/2021 | H04W 72/23 |
| CN | 112740798 | A * | 4/2021 | H04W 72/23 |
| CN | 114342286 | A * | 4/2022 | H04L 1/00 |
| CN | 110830184 | B * | 4/2023 | H04L 5/0055 |
| CN | 116094659 | A * | 5/2023 | H04L 5/0055 |
| CN | 116325573 | A * | 6/2023 | H04L 1/08 |
| CN | 110720245 | B * | 4/2024 | H04W 56/00 |
| CN | 118044309 | A * | 5/2024 | H04L 1/1896 |
| CN | 112511280 | B * | 10/2024 | H04L 5/0055 |
| CN | 112740798 | B * | 12/2024 | H04W 72/535 |
| EP | 3301850 | A1 | 4/2018 | |
| EP | 4114117 | A1 * | 1/2023 | H04W 72/535 |
| EP | 4231569 | A1 * | 8/2023 | H04L 1/1887 |
| EP | 4236492 | A2 * | 8/2023 | H04L 1/1819 |
| EP | 4271082 | A1 * | 11/2023 | H04W 72/232 |
| EP | 3858037 | B1 * | 12/2023 | H04L 5/0078 |
| EP | 4333550 | A2 * | 3/2024 | H04L 5/0078 |
| EP | 4333550 | B1 * | 9/2025 | H04W 72/535 |
| ID | P202303785 | A * | 5/2023 | |
| JP | 2024514497 | A * | 4/2024 | H04L 1/1887 |
| JP | 7671344 | B2 * | 5/2025 | H04L 5/0055 |
| JP | 7738671 | B2 * | 9/2025 | H04W 72/23 |
| KR | 20190124334 | A * | 11/2019 | H04L 1/1887 |
| KR | 102369216 | B1 * | 3/2022 | H04W 72/23 |
| KR | 20230084284 | A * | 6/2023 | H04W 72/232 |
| KR | 20230088887 | A * | 6/2023 | H04W 72/232 |
| KR | 102604279 | B1 * | 11/2023 | H04L 1/1819 |
| WO | 2017123275 | A1 | 7/2017 | |
| WO | 2018145074 | A1 | 8/2018 | |
| WO | WO-2018174664 | A1 * | 9/2018 | H04L 5/0046 |
| WO | WO-2019031936 | A1 * | 2/2019 | H04W 72/23 |
| WO | WO-2020069264 | A1 * | 4/2020 | H04L 5/0078 |
| WO | WO-2022024089 | A1 * | 2/2022 | H04L 1/08 |
| WO | WO-2022078270 | A1 * | 4/2022 | H04W 72/23 |
| WO | WO-2022086135 | A1 * | 4/2022 | H04W 72/541 |
| WO | WO-2022147842 | A1 * | 7/2022 | H04W 72/232 |
| WO | WO-2022207315 | A1 * | 10/2022 | H04W 72/23 |
| WO | WO-2023055282 | A1 * | 4/2023 | H04L 1/1896 |

OTHER PUBLICATIONS

Chinese Office Action for corresponding application 202011098118. 4; Report dated Mar. 28, 2024.
Chinese Search Report for corresponding application 202011098118. 4; Report dated Mar. 27, 2024.
Japanese Office Action for corresponding patent application No. 2023-522921 Report dated Mar. 28, 2024.
MCC Support, "Final Report of 3GPP TSG RAN WG1 #98 v2.0.0 (Prague, Czech Rep, Aug. 26-30, 2019" 3GPP TSG RAN WG1 Meeting #98bis Chongqing, China, Oct. 2019, R1-1911429.
ZTE, "Support additional PDSCH scheduling delay for introduction of 14 HARQ processes in DL for eMTC", 3GPP TSG RAN WG1 Meeting 102, e-meeting, Aug. 2020, R1-2005480.
International Search Report for corresponding application PCT/CN2021/122949 filed Oct. 11, 2021; Mail date Jan. 17, 2022.
Qualcomm Inc, "Increased peak data rate for HD-FDD MTC UEs", 3GPP TSG RAN WG1 #99 R1-1910735, Oct. 20, 2019.
Qualcomm Inc, "Increased peak data rate for HD-FDD MTC UEs", 3GPP TSG RAN WG1 #99 R1-1912694, Nov. 22, 2019.
Qualcomm Inc, "Support of 14 HARQ processes and scheduling delay", 3GPP TSG RAN WG1 #102-e R12006193, Aug. 28, 2020.
Ericsson, "Support of 14 HARQ processes in DL in LTE-MTC" 3GPP TSG-RAN WG1 Meeting #102-e, R1-2005558, Aug. 8, 2020; 5 pages.
Korean Office Action; Application No. 10-2023-7015716; Filing Date: May 9, 2023; Date of mailing: Jul. 8, 2025; 11 pages.
Moderator (Ericsson), "Feature Lead Summary: [102-e-LTE-Rel17_NB_IoT_eMTC-02]", 3GPP TSG-RAN WG1 Meeting #102-e R1-2007265, Aug. 27, 2020; 9 pages.

* cited by examiner

|   | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|----|----|----|----|----|----|----|
| MPDCCH | M0 | M1 | M2 | M3 | M4 | M5 | M6 | M7 | M8 | M9 |  |  |  |  |  |  |  |
| PDSCH |  |  | D0 | D1 | D2 | D3 | D4 | D5 | D6 | D7 | D8 | D9 |  |  |  |  |  |
| PUCCH |  |  |  |  |  |  |  |  |  |  |  |  |  | A0 | A1 | A2 |  |

FIG. 1

| Radio frame index | h |  |  |  |  |  |  |  |  |  |  |  |
|---|---|---|---|---|---|---|---|---|---|---|---|---|
| Subframe index | 0 | 1 | 2 | 3 | 4 | 5 | 6 | 7 | 8 | 9 | 0 | 1 |
| Valid downlink subframe | 1 | 0 | 1 | 1 | 1 | 0 | 1 | 0 | 1 | 1 | 1 | 0 |
| Valid uplink subframe | 1 | 1 | 1 | 1 | 1 | 0 | 1 | 1 | 1 | 1 | 1 | 1 |
|  |  |  |  |  |  |  |  |  |  |  |  |  |
| MPDDCH | 0 |  | 1 |  |  |  |  |  |  |  |  |  |
| PDSCH |  |  |  |  |  |  |  |  | 0 | 1 |  |  |
|  |  |  |  |  |  |  |  |  |  |  |  |  |
| PUCCH |  |  |  |  | A0 |  | A1 | A2 |  |  |  |  |

FIG. 2

| Radio frame | h | | | | | | | | | | h+1 | | | | | | | | | | |
|---|---|---|---|---|---|---|---|---|---|---|---|---|---|---|---|---|---|---|---|---|---|
| Physical subframe | 0 | 1 | 2 | 3 | 4 | 5 | 6 | 7 | 8 | 9 | 0 | 1 | 2 | 3 | 4 | 5 | 6 | 7 | 8 | 9 | |
| Downlink valid indication | 1 | 1 | 1 | 1 | 0 | 1 | 0 | 1 | 1 | 1 | 1 | 1 | 1 | 1 | 0 | 1 | 0 | 1 | 1 | 1 | 1 |
| Uplink valid indication | 1 | 1 | 1 | 1 | 1 | 0 | 0 | 1 | 1 | 0 | 1 | 1 | 1 | 1 | 1 | 0 | 0 | 1 | 1 | 0 | 1 |
| MPDDCH | 0 | 1 | 2 | 3 | | 4 | | 5 | 6 | 7 | 8 | 9 | | | | | | | | | |
| PDSCH | | | 0 | 1 | | 2 | | 3 | 4 | 5 | 6 | 7 | 8 | 9 | | | | | | | |
|  | | | | | | | | | | | | | | | | | | | | | |
| PUCCH | | | | | | | | | | | | | | | | | | A0 | A1 | | A2 |
| Value indicated by the HARQ-ACK delay field | | | 11 | 10 | | 9 | | 8 | 8 | 7 | 6 | 5 | 5 | 4 | | | | | | | |
| Second signaling field | | | 4 | 4 | | 3 | | 2 | 2 | 2 | 2 | 2 | 3 | 3 | | | | | | | |

| Radio frame | h | | | | | | | | | | h+1 | | | | | | | | | | |
|---|---|---|---|---|---|---|---|---|---|---|---|---|---|---|---|---|---|---|---|---|---|
| Physical subframe | 0 | 1 | 2 | 3 | 4 | 5 | 6 | 7 | 8 | 9 | 0 | 1 | 2 | 3 | 4 | 5 | 6 | 7 | 8 | 9 | |
| Downlink valid indication | 1 | 1 | 1 | 1 | 0 | 1 | 0 | 1 | 1 | 1 | 1 | 1 | 1 | 1 | 0 | 1 | 0 | 1 | 1 | 1 | 1 |
| Uplink valid indication | 1 | 1 | 1 | 1 | 1 | 0 | 0 | 1 | 1 | 0 | 1 | 1 | 1 | 1 | 1 | 0 | 0 | 1 | 1 | 0 | 1 |
| MPDDCH | 0 | 1 | 2 | 3 | | 4 | | 5 | 6 | 7 | 8 | 9 | | | | | | | | | |
| PDSCH | | | 0 | 1 | | 2 | | 3 | 4 | 5 | 6 | 7 | 8 | 9 | | | | | | | |
| | | | | | | | | | | | | | | | | | | | | | |
| PUCCH | | | | | | | | | | | | | | | | | | A0 | A1 | | A2 |
| Value indicated by the HARQ-ACK delay field | | | 11 | 10 | | 9 | | 8 | 8 | 7 | 6 | 5 | 5 | 4 | | | | | | | |
| Second signaling field | | | 4 | 4 | | 3 | | 2 | 2 | 2 | 2 | 2 | 3 | 3 | | | | | | | |
| | | | | | | | | | | | | | | | | | | | | | |

INFORMATION DETERMINATION METHOD AND APPARATUS, DEVICE, AND STORAGE MEDIUM

CROSS-REFERENCE TO RELATED APPLICATIONS

This is a National Stage Application, filed under 35 U.S.C. 371, of International Patent Application No. PCT/CN2021/122949, filed on Oct. 11, 2021, which claims priority to Chinese Patent application Ser. No. 20/2011098118.4 filed with the China National Intellectual Property Administration (CNIPA) on Oct. 14, 2020, the disclosures of which are incorporated herein by reference in their entireties.

TECHNICAL FIELD

The present application relates to the field of communication technology, for example, an information determination method and apparatus, a device, and a storage medium.

BACKGROUND

In a machine-type communications (MTC) system in Release 17 (Rel-17), for a half-duplex terminal, 14 hybrid automatic repeat request (HARQ) processes need to be supported in downlink, aiming at improving a downlink peak rate and being suitable for more scenarios. However, no indication mode has been given for a physical downlink shared channel (PDSCH) scheduling delay.

SUMMARY

The present application provides an information determination method and apparatus, a device, and a storage medium to achieve the determination of a PDSCH scheduling delay and further the determination of the PDSCH.

An embodiment of the present application provides an information determination method. The method is applied to a first node and includes the following.

A machine-type communication physical downlink control channel (MPDCCH) is detected on a first subframe, where the MPDCCH carries downlink control information (DCI), and the DCI includes a signaling field indicating a value of a PDSCH scheduling delay; and a second subframe of PDSCH transmission is determined based on the value of the PDSCH scheduling delay.

An embodiment of the present application further provides an information determination apparatus. The apparatus is applied to a first node and includes a detection module and a determination module.

The detection module is configured to detect an MPDCCH on a first subframe, where the MPDCCH carries DCI, and the DCI includes a signaling field indicating a value of a PDSCH scheduling delay. The determination module is configured to determine a second subframe of PDSCH transmission based on the value of the PDSCH scheduling delay.

An embodiment of the present application further provides a device. The device includes one or more processors and a memory.

The memory is configured to store one or more programs, where the one or more programs, when executed by the one or more processors, cause the one or more processors to perform the method according to any embodiments of the present application.

An embodiment of the present application further provides a storage medium. The storage medium is configured to store a computer program, where the computer program, when executed by a processor, performs the method according to any embodiments of the present application.

BRIEF DESCRIPTION OF DRAWINGS

FIG. 1 is a structure diagram of a half duplex-frequency division duplex (HD-FDD) user equipment (UE) supporting 10 HARQ processes according to an embodiment of the present application;

FIG. 2 is a schematic diagram of a scenario where invalid subframes exist when an HD-FDD UE supports 14 HARQ processes according to an embodiment of the present application;

DETAILED DESCRIPTION

Figures 3, 4:
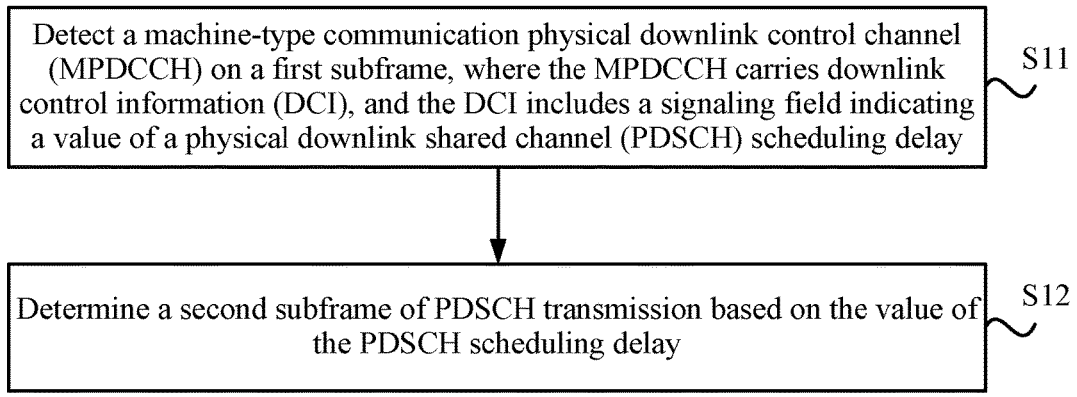
FIG. 3 is a flowchart of an information determination method according to an embodiment of the present application.
FIG. 4 is a diagram illustrating information determination according to an embodiment of the present application.

Embodiments of the present application are described below in conjunction with drawings.

The steps illustrated in the flowcharts among the drawings may be performed by, for example, a computer system capable of executing a set of computer-executable instructions. Moreover, although logical sequences are illustrated in the flowcharts, in some cases, the illustrated or described steps may be performed in sequences different from those described herein.

The technical schemes of the present application can be applied to various communication systems such as a global system for mobile communication (GSM) system, a code-division multiple access (CDMA) system, a wideband code division multiple access (WCDMA) system, a general packet radio service (GPRS) system, a long term evolution (LTE) system, an advanced long term evolution (LTE-A) system, a universal mobile telecommunication system (UMTS) and a 5th generation wireless system (5G), and the communication system is not limited to the embodiments of the present application. In the present application, the 5G system is used as an example for description.

The embodiments of the present application may be applied to wireless networks of different standards. A radio access network may include different communication nodes in different systems. The radio network system includes an evolved NodeB/next-generation NodeB (eNB/gNB) and multiple user equipments (UE1 and UE2). A base station performs wireless communications with the multiple user equipments, respectively, and the multiple user equipments also perform wireless communications with each other.

In the embodiments of the present application, the base station may be a device capable of communicating with a user terminal. The base station may be any device having a radio transceiving function. The base station includes, but is not limited to, a base station (NodeB), an evolved NodeB (eNodeB), a base station in a 5G communication system, a base station in a future communication system, an access node in a wireless fidelity (Wi-Fi) system, a wireless relay node, a wireless backhaul node, and so on. The base station may also be a radio controller in a cloud radio access network (CRAN) scenario. The base station may also be a small cell and a transmission receive point (TRP). The base station is not limited to the embodiments of the present application. In the present application, the 5G base station is used as an example for description.

In the embodiments of the present application, the user terminal is a device having a wireless transceiving function. The user terminal may be deployed on land, for example, the UE may be an indoor device, an outdoor device, a hand-held device, a wearable device and a vehicle-mounted device. The user terminal may also be deployed on the water (for example, on a ship), and may also be deployed in the air (for example, on an airplane, a balloon and a satellite). The user terminal may be a mobile phone, a pad, a computer having a wireless transceiving function, a virtual reality (VR) terminal, an augmented reality (AR) terminal, a wireless terminal for industrial control, a wireless terminal for self driving, a wireless terminal for remote medical, a wireless terminal for smart grid, a wireless terminal for transportation safety, a wireless terminal for a smart city and a wireless terminal for a smart home. Application scenarios are not limited in the embodiments of the present application. The user terminal may also sometimes be referred to as a terminal, an access terminal, a UE unit, a UE station, a mobile station, a mobile, a remote station, a remote terminal, a mobile device, a UE terminal, a wireless communication device, a UE agent or a UE device, etc. The user terminal is not limited to the embodiments of the present application.

The related technologies involved in the embodiments of the application are briefly described below.

Machine-type communication (MTC), also known as machine to machine (M2M), is the main application form of the Internet of things. MTC devices deployed on the market are primarily based on the GSM system. Due to the high spectral efficiency of LTE/LTE-A, more and more mobile operators select the LTE/LTE-A as an evolution direction of the future broadband wireless communication system. Various LTE/LTE-A-based MTC data services will also be more attractive.

An HD-FDD UE supports the maximum of 10 HARQ processes, as shown in FIG. 1.

As can be seen from FIG. 1, the scheduling delay between the MPDCCH and the PDSCH is fixed to 2, and a hybrid automatic repeat request acknowledgement (HARQ-ACK) feedback delay is shown in Table 1.

TABLE 1

| 'HARQ-ACK delay' field in DCI | HARQ-ACK delay value when 'HARQACKDelayType' set to 0 | HARQ-ACK delay value when 'HARQACKDelayType' set to 1 |
| --- | --- | --- |
| 000 | 4 | 4 |
| 001 | 5 | 5 |
| 010 | 7 | 6 |
| 011 | 9 | 7 |
| 100 | 11 | 8 |
| 101 | 13 | 9 |
| 110 | 15 | 10 |
| 111 | 17 | 11 |

Which set of HARQ-ACK delays is selected through a configuration of the higher-layer signaling ce-S chedulingEnhancement, and then timing is performed through the HARQ-ACK delay control field in the DCI.

In an MTC system of Rel-17, for a half-duplex terminal, the downlink needs to support 14 HARQ processes, aiming at improving the downlink peak rate and being suitable for more scenarios. However, no indication mode has been given for the PDSCH scheduling delay, especially in scenarios where the invalid subframe exists.

As shown in FIG. 2, assuming that the DCI carried by MPDCCH0 indicates that the scheduling delay is 7, the UE cannot determine a subframe where corresponding PDSCH0 is located according to the value of the scheduling delay, because the unit of the value of the scheduling delay is not known. If the unit of the value of the scheduling delay is the subframe, PDSCH0 will be transmitted on subframe 7 of radio frame h. Since subframe 7 is an invalid downlink subframe, PDSCH0 will be transmitted on subframe 8, but subframe 8 is an uplink-downlink switching subframe and cannot be used for transmitting the PDSCH. If the unit is the valid downlink subframe, PDSCH0 will be transmitted on subframe 1 of radio frame h+1, and as a result, the PDSCH cannot be transmitted subsequently or transmission of the PDSCH is postponed, affecting the maximum downlink peak rate.

Compared with conventional communication systems, a new radio (NR) system has higher configuration flexibility and a wider bandwidth range, and accordingly, higher requirements are imposed on the capability of terminals so that the terminals need to spend a higher cost than before. However, not all of the various scenarios supported by the NR system require such high capabilities of the terminals, and such scenarios may be, for example, a smart wearable device and an industrial sensor. Therefore, low-configuration terminal device types are defined for such scenarios, such as a smaller bandwidth, fewer antennas, half-duplex FDD (HD-FDD), relaxed UE processing time and relaxed UE processing capabilities, thereby reducing a production cost and the complexity of the terminals. Such terminals may be referred to as low-configuration terminals or NR reduced capability (NR RedCap) user terminals.

For the UE processing capability, the standard defines the PDSCH processing time ($N_1$) and the PUSCH preparation time ($N_2$), where $N_1$ occupies the major part of the minimum time Tproc,1 between the PDSCH and the corresponding HARQ-ACK, and $N_2$ occupies the major part of the minimum time Tproc,2 between a physical downlink control channel (PDCCH) and a physical uplink shared channel (PUSCH). The corresponding $N_1/N_2$ values are different according to different UE capabilities. Table 2 and Table 3 show $N_1$ and $N_2$ corresponding to UE processing capability 1. For the RedCap UE, the processing time is further relaxed, that is, new $N_1/N_2$ are introduced, but the effect of the relaxed processing time on the timing in the HARQ process is not given.

TABLE 2

| | PDSCH processing time $N_1$ [Unit: symbol] | |
| --- | --- | --- |
| $\mu$ | Only front-loaded demodulation reference signal | Configuring an extra demodulation reference signal or no higher-layer signaling configuration |
| 0 | 8 | 13 or 14, depending on the location of the extra reference signal |
| 1 | 10 | 13 |
| 2 | 17 | 20 |
| 3 | 20 | 24 |

TABLE 3

| μ | PUSCH preparation $N_2$ [Unit: symbol] |
|---|---|
| 0 | 10 |
| 1 | 12 |
| 2 | 23 |
| 3 | 36 |

In an embodiment, the embodiments of the present application provide an information determination method. The information determination method is suitable for the case of determining a PDSCH scheduling delay. The information determination method may be performed by an information determination apparatus, and the information determination apparatus may be implemented by software and/or hardware. The method is applied to a first node.

As shown in FIG. 3, the information determination method provided by the embodiments of the present application mainly includes steps S11 and S12.

In S11, an MPDCCH is detected on a first subframe, where the MPDCCH carries DCI, and the DCI includes a signaling field indicating a value of the PDSCH scheduling delay.

In S12, a second subframe of PDSCH transmission is determined based on the value of the PDSCH scheduling delay.

The first node may be any terminal provided above.

In an embodiment, the value of the PDSCH scheduling delay includes a first value and a second value, where the second value includes a first unit and a second unit.

In this embodiment, the first value may be the value of a PDSCH scheduling delay, and the second value may be understood as the unit of the PDSCH scheduling delay. The unit may be subframes or may be specified as other units.

After the second subframe of the PDSCH transmission is determined, the method further includes that the PDSCH is received on the second subframe.

In an embodiment, the second subframe of the PDSCH transmission is determined based on the value of the PDSCH scheduling delay in one or more of the following manners.

If the MPDCCH is detected on a third subframe, the second subframe of the PDSCH transmission is determined according to the first unit corresponding to the value of the PDSCH scheduling delay; or if the MPDCCH is not detected on the third subframe, the second subframe of the PDSCH transmission is determined according to the second unit corresponding to the value of the PDSCH scheduling delay; where the third subframe is the first valid downlink subframe after the first subframe.

A terminal detects an MPDCCH on subframe n, if the terminal also detects the MPDCCH on subframe n+k, the terminal determines the subframe where the PDSCH transmission corresponding to the MPDCCH on the subframe n is located according to the first unit corresponding to the scheduling delay, or if the terminal does not detect the MPDCCH on subframe n+k, the terminal determines the subframe where the PDSCH transmission is located according to the second unit corresponding to the value of the PDSCH scheduling delay, where subframe n+k is the first valid downlink subframe after subframe n.

The subframe where the PDSCH transmission is located is the second subframe.

In an embodiment, the second subframe of the PDSCH transmission is determined based on the value of the PDSCH scheduling delay in one or more of the following manners.

If the number of valid downlink subframes between the first subframe and a fourth subframe is the first number, the second subframe of the PDSCH transmission is determined according to the first unit corresponding to the value of the PDSCH scheduling delay; or if the number of valid downlink subframes between the first subframe and the fourth subframe is the second number, the second subframe of the PDSCH transmission is determined according to the second unit corresponding to the value of the PDSCH scheduling delay; where the fourth subframe is the $1^{st}$ downlink-to-uplink transition subframe after the first subframe.

In this embodiment, the first number may be pre-configured according to actual conditions, the first number may be 1, and the second number may be 0.

If the number of valid downlink subframes between subframe n and subframe n+r is b1, the terminal determines the subframe where the PDSCH transmission is located according to the first unit corresponding to the value of the PDSCH scheduling delay, where subframe n+r is the Pt downlink-to-uplink transition subframe after subframe n, and b1 may be 1.

If the number of valid downlink subframes between subframe n and subframe n+r is b2, the terminal determines the subframe where the PDSCH transmission is located according to the second unit corresponding to the value of the PDSCH scheduling delay, where subframe n+r is the $1^{st}$ downlink-to-uplink transition subframe after subframe n, and b2 may be 0.

In an embodiment, the second subframe of the PDSCH transmission is determined based on the value of the PDSCH scheduling delay in one or more of the following manners.

If the number of valid downlink subframes between the first subframe and the fourth subframe is greater than or equal to the first number, the second subframe of the PDSCH transmission is determined according to the first unit corresponding to the value of the scheduling delay; or if the number of valid downlink subframes between the first subframe and the fourth subframe is less than the first number, the second subframe of the PDSCH transmission is determined according to the second unit corresponding to the value of the scheduling delay; where the fourth subframe is the $1^{st}$ downlink-to-uplink transition subframe after the first subframe.

In this embodiment, the first number may be pre-configured according to actual conditions, and the first number may be 1.

If the number of valid downlink subframes between subframe n and subframe n+r is b1 and b1 is greater than or equal to 1, the terminal determines the subframe where the PDSCH transmission is located according to the first unit corresponding to the value of the PDSCH scheduling delay, where subframe n+r is the $1^{st}$ downlink-to-uplink transition subframe after subframe n, and b1 may be 1.

If the number of valid downlink subframes between subframe n and subframe n+r is b1 and b1 is less than 0, the terminal determines the subframe where the PDSCH transmission is located according to the first unit corresponding to the value of the PDSCH scheduling delay, where subframe n+r is the $1^{st}$ downlink-to-uplink transition subframe after subframe n.

In an embodiment, the second subframe of the PDSCH transmission is determined based on the value of the PDSCH scheduling delay in one or more of the following manners.

When an HARQ process index indicated in the DCI is a first predefined value, the second subframe of the PDSCH transmission is determined according to the first unit corresponding to the value of the PDSCH scheduling delay; or when the HARQ process index indicated in the DCI is a second predefined value, the second subframe of the PDSCH transmission is determined according to the second unit corresponding to the value of the PDSCH scheduling delay; where the first predefined value is an odd number or a specific process index, and the second predefined value is an even number or another specific process index.

When the HARQ process index indicated in the DCI is an odd number or a specific process index, the terminal determines the subframe where the PDSCH transmission is located according to the first unit corresponding to the value of the PDSCH scheduling delay; when the HARQ process index indicated in the DCI is an even number or another specific process index, the terminal determines the subframe where the PDSCH transmission is located according to the second unit corresponding to the value of the PDSCH scheduling delay; and vice versa.

In an embodiment, the second subframe of the PDSCH transmission is determined based on the value of the PDSCH scheduling delay in one or more of the following manners.

When a value of an HARQ-ACK delay indicated in the DCI is greater than or equal to a third number, the second subframe of the PDSCH transmission is determined according to the first unit corresponding to the value of the scheduling delay; or when the value of the HARQ-ACK delay indicated in the DCI is less than the third number, the second subframe of the PDSCH transmission is determined according to the second unit corresponding to the value of the scheduling delay; where the third number is a preset value or a higher-layer configured value.

When the value of the HARQ-ACK delay indicated in the DCI is greater than or equal to M, the terminal determines the subframe where the PDSCH transmission is located according to the first unit corresponding to the value of the PDSCH scheduling delay; or when the value of the HARQ-ACK delay indicated in the DCI is less than M, the terminal determines the subframe where the PDSCH transmission is located according to the second unit corresponding to the value of the PDSCH scheduling delay; where M is a preset value or a higher-layer configured value.

In an embodiment, the case where the DCI includes the signaling field indicating the value of the PDSCH scheduling delay includes that a first signaling field in the DCI indicates the value of the PDSCH scheduling delay, where the first signaling field is a signaling field indicating the number of PDSCH repetitions, or the first signaling field is a newly added signaling field.

In an embodiment, the case where the DCI includes the signaling field indicating the value of the PDSCH scheduling delay includes that the first signaling field in the DCI indicates the value of the PDSCH scheduling delay, where when 14 HARQ processes are configured, the first signaling field is 2 bits, and the signaling field indicating the number of PDSCH repetitions occupies 0 bit.

In an embodiment, the DCI further includes one or more signaling fields indicating a value of an HARQ-ACK feedback delay; and the method further includes that a fifth subframe for transmitting HARQ-ACK response information is determined based on the value of the HARQ-ACK feedback delay.

The terminal transmits the HARQ-ACK response information on the fifth subframe according to the PDSCH reception condition.

In an embodiment, the value of the HARQ-ACK feedback delay is determined through an HARQ-ACK feedback delay signaling field and a second signaling field in the DCI.

The value of the HARQ-ACK feedback delay is determined through k1 indicated by the HARQ-ACK delay indication field and k2 indicated by the second signaling field in the DCI, that is, a UE receives the PDSCH on subframe m and transmits HARQ-ACK response information on subframe m+k1+k2.

In an embodiment, the second signaling field is used for indicating the number of invalid subframes between a PDSCH and a corresponding HARQ; or the second signaling field is used for indicating a predetermined value; or the second signaling field is used for indicating a value configured by higher-layer signaling.

The second signaling field may be a signaling field indicating the number of PDSCH repetitions or may be an additional signaling field.

When 14-HARQ processes are configured, the second signaling field is 2 bits, and the signaling field indicating the number of PDSCH repetitions occupies 0 bit.

In an embodiment, the value of the PDSCH scheduling delay and the value of the HARQ-ACK feedback delay are determined through a PDSCH repetition number signaling field and an HARQ-ACK feedback delay signaling field in the DCI.

In an embodiment, the value of the PDSCH scheduling delay and the value of the HARQ-ACK feedback delay are determined through a third signaling field and an HARQ-ACK feedback delay signaling field in the DCI, where when the third signaling field exists, the signaling field for indicating the number of PDSCH repetitions occupies 0 bit.

In an embodiment, the fifth subframe is the $1^{st}$ valid uplink subframe after the second subframe, a fourth number of valid downlink subframes, a fifth number of physical subframes and a sixth number of valid uplink subframes.

In an embodiment, the fourth number and the sixth number are determined through one or more signaling fields in the DCI, and the fifth number is a preset value.

In an embodiment, the value of the PDSCH scheduling delay, the fourth number and the sixth number are determined through one signaling field in the DCI, and the fifth number is a preset value.

In an embodiment, the fifth subframe is a seventh-number$^{th}$ valid uplink subframe after the second subframe, a fourth number of valid downlink subframes and a fifth number of physical subframes.

In an embodiment, the fourth number and the seventh number are determined through one or more signaling fields in the DCI, and the seventh number is a preset value.

In an embodiment, the value of the PDSCH scheduling delay, the fourth number and the seventh number are determined through one signaling field in the DCI, and the seventh number is a preset value.

In an embodiment, the second subframe determined according to the first unit corresponding to the value of the PDSCH scheduling delay includes: the $2^{nd}$ physical subframe after the first subframe, two physical subframes and three valid uplink subframes; and the second subframe according to the second unit corresponding to the value of the PDSCH scheduling delay includes: the $3^{rd}$ physical subframe after the first subframe, one physical subframe and three valid uplink subframes.

In an embodiment, the second subframe determined according to the first unit corresponding to the value of the PDSCH scheduling delay includes: the $1^{st}$ valid downlink subframe after the first subframe, one valid downlink subframe, one physical subframe, three valid uplink subframes and one physical subframe; and the second subframe determined according to the second unit corresponding to the value of the PDSCH scheduling delay includes: the $2^{nd}$ valid downlink subframe after the first subframe, one physical subframe, three valid uplink subframes and one physical subframe.

In an example embodiment, a method for implicitly determining a PDSCH scheduling delay is provided.

The terminal detects an MPDCCH on subframe n, where the DCI indicates that the value of the PDSCH scheduling delay is 7, the terminal determines the subframe where the PDSCH transmission is located according to at least one of the following manners, and the terminal receives the PDSCH.

In manner one, if the terminal detects the MPDCCH on subframe n+k, the terminal determines the subframe where the PDSCH transmission is located according to the first unit corresponding to the value of the scheduling delay, where subframe n+k is the $1^{st}$ valid downlink subframe after subframe n.

In manner two, if the terminal does not detect the MPDCCH on subframe n+k, the terminal determines the subframe where the PDSCH transmission is located according to the second unit corresponding to the value of the scheduling delay, where subframe n+k is the $1^{st}$ valid downlink subframe after subframe n.

In manner three, if the number of valid downlink subframes between subframe n and subframe n+r is b1, the terminal determines the subframe where the PDSCH transmission is located according to the first unit corresponding to the value of the scheduling delay, where subframe n+r is the Pt downlink-to-uplink transition subframe after subframe n, and b1 may be 1.

In manner four, if the number of valid downlink subframes between subframe n and subframe n+r is b2, the terminal determines the subframe where the PDSCH transmission is located according to the second unit corresponding to the value of the scheduling delay, where subframe n+r is the $1^{st}$ downlink-to-uplink transition subframe after subframe n, and b2 may be 0.

In manner five, when the HARQ process index indicated in the DCI is a first predefined value (an odd number or a specific process index), the terminal determines the subframe where the PDSCH transmission is located according to the first unit corresponding to the value of the scheduling delay; and when the HARQ process index indicated in the DCI is a second predefined value (an even number or another specific process index), the terminal determines the subframe where the PDSCH transmission is located according to the second unit corresponding to the value of the scheduling delay; and vice versa.

In manner six, when the value of the HARQ-ACK delay indicated in the DCI is greater than or equal to M, the terminal determines the subframe where the PDSCH transmission is located according to the first unit corresponding to the value of the scheduling delay; and when the value of the HARQ-ACK delay indicated in the DCI is less than M, the terminal determines the subframe where the PDSCH transmission is located according to the second unit corresponding to the value of the scheduling delay; where M is a preset value or a higher-layer configured value.

In manner seven, if the number of valid downlink subframes between subframe n and subframe n+r is greater than or equal to b3, the terminal determines the subframe where the PDSCH transmission is located according to the first unit corresponding to the value of the scheduling delay, where subframe n+r is the $1^{st}$ downlink-to-uplink transition subframe after subframe n.

In manner eight, if the number of valid downlink subframes between subframe n and subframe n+r is less than b3, the terminal determines the subframe where the PDSCH transmission is located according to the second unit corresponding to the value of the scheduling delay, where subframe n+r is the $1^{st}$ downlink-to-uplink transition subframe after subframe n.

The first unit corresponding to the scheduling delay is one valid downlink subframe, one physical subframe, three valid uplink subframes, one physical subframe and one valid downlink subframe, and the second unit is one physical subframe, three valid uplink subframes, one physical subframe and two valid downlink subframes.

The first unit corresponding to the scheduling delay represents that the terminal detects the MPDCCH on subframe n and then transmits the PDSCH on the $1^{st}$ valid downlink subframe after one valid downlink subframe, one physical subframe, three valid uplink subframes and one physical subframe after subframe n, and the second unit represents that the terminal detects the MPDCCH on subframe n and then transmits the PDSCH on the $2^{nd}$ valid downlink subframe after one physical subframe, three valid uplink subframes and one physical subframe after the subframe n.

Alternatively, the first unit corresponding to the scheduling delay is two physical subframes, three valid uplink subframes and two physical subframes, and the second unit is one physical subframe, three valid uplink subframes and three physical subframes.

The first unit corresponding to the scheduling delay represents that the terminal detects the MPDCCH on subframe n and then transmits the PDSCH on the $2^{nd}$ physical subframe after two physical subframes and three valid uplink subframes after subframe n, and the second unit represents that the terminal detects the MPDCCH on subframe n and then transmits the PDSCH on $3^{rd}$ physical subframe after one physical subframe and three valid uplink subframes after subframe n.

In an example embodiment, a method for explicitly determining the PDSCH scheduling delay is provided.

The terminal detects an MPDCCH on subframe n, the terminal determines the subframe where the PDSCH transmission is located according to a value of the scheduling delay indicated in the DCI, and the terminal receives the PDSCH.

The value of the PDSCH scheduling delay is indicated by a first signaling field of 2 bits in the DCI, as shown in Table 4.

TABLE 4

| First signaling field | Value of PDSCH scheduling delay |
|---|---|
| 00 | 2 |
| 01 | 7 (First unit) |
| 10 | 7 (Second unit) |
| 11 | Reserved |

The first signaling field of 2 bits may be a signaling field indicating the number of PDSCH repetitions or may be an additional signaling field. Alternatively, when 14-HARQ processes are configured, the first signaling field is 2 bits, and the signaling field indicating the number of PDSCH repetitions occupies 0 bit.

In an example embodiment, a method for explicitly determining a value of an HARQ-ACK delay is provided.

The terminal receives a PDSCH on subframe m, the terminal determines the subframe where the HARQ-ACK corresponding to the PDSCH is located according to a value of an HARQ-ACK feedback delay indicated in the DCI; and the terminal transmits the HARQ-ACK according to the PDSCH reception condition.

The value of the HARQ-ACK feedback delay is determined through k1 indicated by the HARQ-ACK delay indication field and k2 indicated by the second signaling field in the DCI, that is, the UE receives the PDSCH on subframe m and transmits the HARQ-ACK on subframe m+k1+k2.

The second signaling field indicates the number of invalid subframes between the PDSCH and the corresponding HARQ. The terminal determines the value of k2 according to an uplink-downlink invalid subframe configuration and a value indicated by the second signaling field, and assuming that the second signaling field is 2 bits, the meaning for the second signaling field is shown in Table 5.

TABLE 5

| Second signaling field | Value of k2 |
|---|---|
| 00 | 0/4 |
| 01 | 1/5 |
| 10 | 2/6 |
| 11 | 3/7 |

The second signaling field may be a signaling field indicating the number of PDSCH repetitions or may be an additional signaling field; or when 14-HARQ processes are configured, the second signaling field is 2 bits, and the signaling field indicating the number of PDSCH repetitions occupies 0 bit.

In an embodiment, as shown in FIG. 4, the terminal obtains an attribute of a subframe through downlink valid indication signaling and uplink valid indication signaling configured by a higher layer. That is, when the value indicated by the downlink valid indication is 1, the subframe is a valid downlink subframe, and when the value indicated by the downlink valid indication is 0, the subframe is an invalid downlink subframe; and the uplink valid indication has the same meaning. Assuming that the UE receives PDSCH0 on subframe 2 of radio frame h, the HARQ-ACK delay indication field in the corresponding DCI indicates that k1 is equal to 11, and the second signaling field is 00. Since the UE may obtain the configuration of the invalid subframe, the UE determines that k2 is equal to 4, and then the UE transmits the corresponding HARQ-ACK on subframe 7 of radio frame h+1.

In an example embodiment, a method for explicitly determining a value of an HARQ-ACK delay is provided.

The terminal receives a PDSCH on subframe m, the terminal determines the subframe where the HARQ-ACK corresponding to the PDSCH is located according to a value of an HARQ-ACK feedback delay indicated in the DCI; and the terminal transmits the HARQ-ACK according to the PDSCH reception condition.

The value of the HARQ-ACK feedback delay is determined through k1 indicated by the HARQ-ACK delay indication field and k2 indicated by the second signaling field in the DCI, that is, the UE receives the PDSCH on subframe m and transmits the HARQ-ACK on subframe m+k1+k2.

The second signaling field may be a signaling field indicating the number of PDSCH repetitions or may be an additional signaling field; or when 14-HARQ processes are configured, the first signaling field is 2 bits, and the signaling field indicating the number of PDSCH repetitions occupies 0 bit.

For example, the second signaling field is 3 bits as shown in Table 6.

TABLE 6

| Second signaling field | Value of k2 |
|---|---|
| 000 | 0 |
| 001 | 1 |
| 010 | 2 |
| 011 | 3 |
| 100 | 4 |
| 101 | 5 |
| 110 | 6 |
| 111 | 7 |

Figures 5, 6:
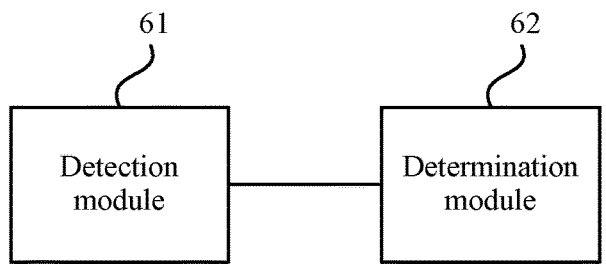
FIG. 5 is a diagram illustrating information determination according to an embodiment of the present application.
FIG. 6 is a structure diagram of an information determination apparatus according to an embodiment of the present application.

In an embodiment, as shown in FIG. 5, when the value indicated by the downlink valid indication is 1, the subframe is a valid downlink subframe, and when the value indicated by the downlink valid indication is 0, the subframe is an invalid downlink subframe; and the uplink valid indication has the same meaning. Assuming that the UE receives PDSCH0 on subframe 2 of radio frame h, the HARQ-ACK delay indication field in the corresponding DCI indicates that k1 is equal to 11, and the second signaling field is 100, that is, k2 is equal to 4. The UE transmits the corresponding HARQ-ACK on subframe 7 of radio frame h+1.

In an example embodiment, a method of indicating the value of the PDSCH scheduling delay and the value of the HARQ-ACK feedback delay jointly by the DCI is provided.

The terminal detects an MPDCCH on subframe n, receives a PDSCH on subframe m according to a PDSCH scheduling delay indicated by the DCI, and determines the subframe where an HARQ-ACK corresponding to the PDSCH is located according to the value of the HARQ-ACK feedback delay indicated in the DCI; and the terminal transmits the HARQ-ACK according to the PDSCH reception condition.

The PDSCH scheduling delay and the HARQ-ACK feedback delay are determined through the PDSCH repetition number signaling field and an HARQ-ACK delay field in the DCI in the following manner.

When the value of the PDSCH repetition number field is 00, the value of the PDSCH scheduling delay is 2, and the value of the HARQ-ACK feedback delay is determined according to the HARQ-ACK delay field; when the value of the PDSCH repetition number field is 01, the value of the PDSCH scheduling delay is 7, and the value of the HARQ-ACK feedback delay is 12; when the value of the PDSCH repetition number field is 10, the value of the PDSCH scheduling delay is 7, and the value of the HARQ-ACK feedback delay is 13; when the value of the PDSCH repetition number field is 11, it is a reserved state.

The PDSCH repetition number signaling field in this embodiment may also be a third signaling field, and at this point, the PDSCH repetition number signaling field occupies 0 bit.

In an example embodiment, a method of DCI jointly indicating the value of the PDSCH scheduling delay and the value of the HARQ-ACK feedback delay is provided.

The terminal detects an MPDCCH on subframe n, receives a PDSCH on subframe m according to a PDSCH scheduling delay indicated by the DCI, and determines the subframe where an HARQ-ACK corresponding to the PDSCH is located according to a value of an HARQ-ACK feedback delay indicated in the DCI; and the terminal transmits the HARQ-ACK according to the PDSCH reception condition.

The PDSCH scheduling delay and the HARQ-ACK feedback delay are determined through the PDSCH repetition number field and the HARQ-ACK delay field in the DCI in the following manner.

When the value of the PDSCH repetition number field is 00, the value of the PDSCH scheduling delay is 2, and the value of the HARQ-ACK feedback delay is determined according to the HARQ-ACK delay field; when the value of the PDSCH repetition number field is 01 and a $g^{th}$ bit in the HARQ-ACK feedback delay field is 1, the value of the PDSCH scheduling delay is 7 and corresponds to the first unit, and the value of the HARQ-ACK feedback delay is 12; when the value of the PDSCH repetition number field is 01 and the $g^{th}$ bit in the HARQ-ACK feedback delay field is 0, the value of the PDSCH scheduling delay is 7 and corresponds to the second unit, and the value of the HARQ-ACK feedback delay is 12; when the value of the PDSCH repetition number field is 10 and the $g^{th}$ bit in the HARQ-ACK feedback delay field is 1, the value of the PDSCH scheduling delay is 7 and corresponds to the first unit, and the value of the HARQ-ACK feedback delay is 13; when the value of the PDSCH repetition number field is 10 and the $g^{th}$ bit in the HARQ-ACK feedback delay field is 10, the value of the PDSCH scheduling delay is 7 and corresponds to the second unit, and the value of the HARQ-ACK feedback delay is 13; and when the value of the PDSCH repetition number field is 1110, it is a reserved state. The PDSCH repetition number field in this embodiment may also be a third signaling field, and at this point, the PDSCH repetition number field occupies 0 bit. In this embodiment, g is predetermined.

In an embodiment, the terminal detects an MPDCCH on subframe n, receives a PDSCH on subframe m according to a PDSCH scheduling delay indicated by DCI, and determines the subframe where an HARQ-ACK corresponding to the PDSCH is located according to a value of the HARQ-ACK feedback delay indicated in the DCI; and the terminal transmits the HARQ-ACK according to the PDSCH reception condition. It is assumed that g is equal to 1.

The value of the PDSCH repetition number field in the DCI is 01, and the value of the HARQ-ACK delay field is 1xx; then the terminal determines that the PDSCH scheduling delay is 7 and corresponds to the first unit, and that the value of the HARQ-ACK feedback delay is 12. The PDSCH repetition number signaling field in this embodiment may also be a third signaling field, and at this point, the PDSCH repetition number signaling field occupies 0 bit.

In an embodiment, the terminal detects an MPDCCH on subframe n, receives a PDSCH on subframe m according to a PDSCH scheduling delay indicated by DCI, and determines the subframe where an HARQ-ACK corresponding to the PDSCH is located according to the value of the HARQ-ACK feedback delay indicated in the DCI; and the terminal transmits the HARQ-ACK according to the PDSCH reception condition. It is assumed that g is equal to 1.

The value of the PDSCH repetition number field in the DCI is 10, and the value of the HARQ-ACK delay field is 0xx; then the terminal determines that the PDSCH scheduling delay is 7 and corresponds to the second unit, and that the value of the HARQ-ACK feedback delay is 13. The PDSCH repetition number signaling field in this embodiment may also be a third signaling field, and at this point, the PDSCH repetition number signaling field occupies 0 bit.

In an example embodiment, a method of DCI jointly indicating the value of the PDSCH scheduling delay and the value of the HARQ-ACK feedback delay is provided.

The terminal detects an MPDCCH on subframe n, receives a PDSCH on subframe m according to the PDSCH scheduling delay indicated by the DCI, and determines the subframe where an HARQ-ACK corresponding to the PDSCH is located according to the value of the HARQ-ACK feedback delay indicated in the DCI; and the terminal transmits the HARQ-ACK according to the PDSCH reception condition.

The PDSCH scheduling delay and the HARQ-ACK feedback delay are determined through the PDSCH repetition number signaling field and the HARQ-ACK delay field in the DCI, the PDSCH repetition number field in this embodiment may also be a third signaling field, and at this point, the PDSCH repetition number field occupies 0 bit. Table 7 is as follows.

TABLE 7

| PDSCH repetition number field | HARQ-ACK delay field | PDSCH scheduling delay | HARQ feedback delay |
|---|---|---|---|
| 00 | 000 | 2 | 4 |
|  | 001 | 2 | 5 |
|  | 010 | 2 | 6 |
|  | 011 | 2 | 7 |
|  | 100 | 2 | 8 |
|  | 101 | 2 | 9 |
|  | 110 | 2 | 10 |
|  | 111 | 2 | 11 |
| 01 | 000 | 7 | 12 |
|  | 001 | 7 | 13 |
|  | Reserved |  |  | alternatively.

| PDSCH repetition number field | HARQ-ACK delay field | PDSCH scheduling delay | HARQ feedback delay |
|---|---|---|---|
| 00 | 000 | 2 | 4 |
|  | 001 | 2 | 5 |
|  | 010 | 2 | 6 |
|  | 011 | 2 | 7 |
|  | 100 | 2 | 8 |
|  | 101 | 2 | 9 |
|  | 110 | 2 | 10 |
|  | 111 | 2 | 11 |
| 01 | 000 | 7 (First unit) | 12 |
|  | 001 | 7 (Second unit) | 12 |
|  | 010 | 7 (First unit) | 13 |
|  | 010 | 7 (Second unit) | 13 |
|  | Reserved |  |  |

In an example embodiment, the terminal detects an MPDCCH on subframe n, receives a PDSCH on subframe m according to a PDSCH scheduling delay indicated by DCI, and determines the subframe where an HARQ-ACK corresponding to the PDSCH is located according to the value of the HARQ-ACK feedback delay and k2 indicated in the DCI; and the terminal transmits the HARQ-ACK according to the PDSCH reception condition.

The PDSCH scheduling delay, the HARQ-ACK feedback delay and k2 are determined through the PDSCH repetition number signaling field and the HARQ-ACK delay field in the DCI, the PDSCH repetition number field in this embodiment may also be a third signaling field, and at this point, the PDSCH repetition number field occupies 0 bit. Table 8 is as follows.

TABLE 8

| PDSCH repetition number field | HARQ-ACK delay field | PDSCH scheduling delay | HARQ feedback delay | k2 |
|---|---|---|---|---|
| 00 | 000 | 2 | 4 | 0 |
|    | 001 | 2 | 4 | d1 |
|    | 010 | 2 | 5 | 0 |
|    | 011 | 2 | 5 | d2 |
|    | 100 | 2 | 6 | 0 |
|    | 101 | 2 | 6 | d3 |
|    | 110 | 2 | 7 | 0 |
|    | 111 | 2 | 7 | d4 |
| 01 | 000 | 2 | 8 | 0 |
|    | 001 | 2 | 8 | d5 |
|    | 010 | 2 | 9 | 0 |
|    | 011 | 2 | 9 | d6 |
|    | 100 | 2 | 10 | 0 |
|    | 101 | 2 | 10 | d7 |
|    | 110 | 2 | 11 | 0 |
|    | 111 | 2 | 11 | d8 |
| 10 | 000 | 7 (First unit) | 12 | 0 |
|    | 001 | 7 (First unit) | 12 | d9 |
|    | 010 | 7 (First unit) | 13 | 0 |
|    | 011 | 7 (First unit) | 13 | d10 |
|    | 100 | 7 (Second unit) | 12 | 0 |
|    | 101 | 7 (Second unit) | 12 | d11 |
|    | 110 | 7 (Second unit) | 13 | 0 |
|    | 111 | 7 (Second unit) | 13 | d12 |
|    |     | Reserved |   |   |

In the above table, d0 to d12 are positive integers greater than 0 and may be preset or configured through higher-layer signaling.

In an example embodiment, the terminal receives a PDSCH in a second subframe and transmits corresponding HARQ-ACK response information on a fifth subframe according to the PDSCH reception condition, where the fifth subframe is the $1^{st}$ valid uplink subframe after the second subframe, n1 valid downlink subframes, n2 physical subframes and n3 valid uplink subframes, and n2 is a preset value.

n1 and n3 are indicated jointly by one control field in the DCI or by two control fields, respectively.

n1 ranges from 0 to 13, n3 ranges from 0 to 2, and the value of n2 is 1.

In an example embodiment, the terminal receives a PDSCH in the second subframe and transmits corresponding HARQ-ACK response information on the fifth subframe according to the PDSCH reception condition, where the fifth subframe is an n4th valid uplink subframe after the second subframe, n1 valid downlink subframes and n2 physical subframes, and n2 is a preset value.

n1 and n4 are indicated jointly by one control field in the DCI or by two control fields, respectively.

n1 ranges from 0 to 13, n4 ranges from 1 to 3, and the value of n2 is 1.

In an example embodiment, the terminal detects the MPDCCH on subframe n, receives the PDSCH on subframe m and transmits corresponding HARQ-ACK response information on subframe s according to the PDSCH reception condition, where subframe s is the $1^{st}$ valid uplink subframe after n1 valid downlink subframes, n2 physical subframes and n3 valid uplink subframes after subframe m; and the terminal obtains values of the PDSCH scheduling delay, n1, n2 and n3 according to the value of the third indication field, where the value indicated by the third indication field ranges from 0 to 11.

In an embodiment, the values of the PDSCH scheduling delay, n1, n2 and n3 indicated by the third indication field are shown in Table 9.

TABLE 9

| Third field indication | PDSCH scheduling delay | HARQ feedback delay n1 | n2 | n3 |
|---|---|---|---|---|
| 0 | 7 (First unit) | 11 | 1 | 0 |
| 1 | 7 (Second unit) | 10 | 1 | 0 |
| 2 | 2 | 9 | 1 | 0 |
| 3 | 2 | 8 | 1 | 0 |
| 4 | 2 | 7 | 1 | 1 |
| 5 | 2 | 6 | 1 | 1 |
| 6 | 2 | 5 | 1 | 1 |
| 7 | 2 | 4 | 1 | 1 |
| 8 | 2 | 3 | 1 | 2 |
| 9 | 2 | 2 | 1 | 2 |
| 10 | 2 | 1 | 1 | 2 |
| 11 | 2 | 0 | 1 | 2 |

In an embodiment, when the value T of the third indication field is less than 10, the value of the PDSCH scheduling delay is 2; when T is 10, the value of the PDSCH scheduling delay is 7 and corresponds to the first unit; and when T is 11, the value of the PDSCH scheduling delay is 7 and corresponds to the second unit.

When T is 0 to 3, n3 is 2; when T is 4 to 7, n3 is 1; and when T is 8 to 11, n3 is equal to 0, n1 is equal to T, and n2 is equal to 1.

In an example embodiment, the terminal detects the MPDCCH on subframe n, receives the PDSCH on subframe m and transmits corresponding HARQ-ACK response information on subframe s according to the PDSCH reception condition, where subframe s is an $n4^{th}$ valid uplink subframe after n1 valid downlink subframes and n2 physical subframes after the subframe m; and the terminal obtains the values of the PDSCH scheduling delay, n1, n2 and n4 according to the value of a fourth indication field, where the value indicated by the fourth indication field ranges from 0 to 11.

In an embodiment, the values of the PDSCH scheduling delay, n1, n2 and n4 indicated by the fourth indication field are shown in Table 10.

TABLE 10

| Fourth field indication | PDSCH scheduling delay | HARQ feedback delay n1 | n2 | n3 |
|---|---|---|---|---|
| 0 | 7 (First unit) | 11 | 1 | 1 |
| 1 | 7 (Second unit) | 10 | 1 | 1 |
| 2 | 2 | 9 | 1 | 1 |
| 3 | 2 | 8 | 1 | 1 |
| 4 | 2 | 7 | 1 | 2 |
| 5 | 2 | 6 | 1 | 2 |
| 6 | 2 | 5 | 1 | 2 |
| 7 | 2 | 4 | 1 | 2 |
| 8 | 2 | 3 | 1 | 3 |
| 9 | 2 | 2 | 1 | 3 |
| 10 | 2 | 1 | 1 | 3 |
| 11 | 2 | 0 | 1 | 3 |

The above table is an example, and other combinations are not excluded.

In an embodiment, when the value T of the fourth indication field is less than 10, the value of the PDSCH scheduling delay is 2; when T is 10, the value of the PDSCH scheduling delay is 7 and corresponds to the first unit; and when T is 11, the value of the PDSCH scheduling delay is 7 and corresponds to the second unit.

When T is 0 to 3, n4 is 2; when T is 4 to 7, n4 is 2; and when T is 8 to 11, n4 is equal to 1, n1 is equal to T, and n2 is equal to 1.

In an example embodiment, the terminal detects the MPDCCH on subframe n, receives the PDSCH on subframe m and transmits corresponding HARQ-ACK response information on subframe s according to the PDSCH reception condition, where subframe s is the 1st valid uplink subframe after n5 valid downlink subframes, n6 physical subframes and n7 valid uplink subframes after the subframe m; and the terminal obtains values of the PDSCH scheduling delay, n5, n6 and n7 according to the value of the third indication field, where the value indicated by the third indication field ranges from 0 to 23.

In an embodiment, the values of the PDSCH scheduling delay, n5, n6 and n7 indicated by the third indication field are shown in Table 11.

TABLE 11

| Third field indication | PDSCH scheduling delay | HARQ feedback delay | | |
|---|---|---|---|---|
| | | n5 | n6 | n7 |
| 0 | 7 (First unit) | 11 | 1 | 0 |
| 1 | 7 (Second unit) | 10 | 1 | 0 |
| 2 | 2 | 9 | 1 | 0 |
| 3 | 2 | 8 | 1 | 0 |
| 4 | 2 | 7 | 1 | 1 |
| 5 | 2 | 6 | 1 | 1 |
| 6 | 2 | 5 | 1 | 1 |
| 7 | 2 | 4 | 1 | 1 |
| 8 | 2 | 3 | 1 | 2 |
| 9 | 2 | 2 | 1 | 2 |
| 10 | 2 | 1 | 1 | 2 |
| 11 | 2 | 0 | 1 | 2 |
| 12 | 7 (First unit) | 11 | 1 | 0 |
| 13 | 7 (Second unit) | 10 | 1 | 1 |
| 14 | 2 | 9 | 1 | 2 |
| 15 | 2 | 8 | 1 | 0 |
| 16 | 2 | 7 | 1 | 1 |
| 17 | 2 | 6 | 1 | 2 |
| 18 | 2 | 5 | 1 | 0 |
| 19 | 2 | 4 | 1 | 1 |
| 20 | 2 | 3 | 1 | 2 |
| 21 | 2 | 2 | 1 | 0 |
| 22 | 2 | 1 | 1 | 1 |
| 23 | 2 | 0 | 1 | 2 |

The above table is an example, and other combinations are not excluded.

In an embodiment, when the value T of the third indication field is 0 to 9 or is greater than 12 to 21, the value of the PDSCH scheduling delay is 2; when T is 10 or 22, the value of the PDSCH scheduling delay is 7 and corresponds to the first unit; and when T is 11 or 23, the value of the PDSCH scheduling delay is 7 and corresponds to the second unit.

When T is one of 0 to 3, 12, 15, 18 or 21, n7 is 2; when T is one of 4 to 7, 13, 16, 19 or 22, n7 is 1; and when T is one of 8 to 11, 14, 17, 20 or 23, n7 is equal to 0, n5 is equal to mod(T, 12), and n6 is equal to 1.

In an example embodiment, the terminal detects the MPDCCH on subframe n, receives the PDSCH on the subframe m and transmits corresponding HARQ-ACK response information on subframe s according to the PDSCH reception condition, where subframe s is an n8$^{th}$ valid uplink subframe transmission after n5 valid downlink subframes and n6 physical subframes after subframe m; and the terminal obtains values of the PDSCH scheduling delay, n5, n6 and n8 according to the value of a fourth indication field, where the value indicated by the fourth indication field ranges from 0 to 23.

In an embodiment, the values of the PDSCH scheduling delay, n5, n6 and n8 indicated by the fourth indication field are shown in Table 12.

TABLE 12

| Fourth field indication | PDSCH scheduling delay | HARQ feedback delay | | |
|---|---|---|---|---|
| | | n5 | n6 | n8 |
| 0 | 7 (First unit) | 11 | 1 | 1 |
| 1 | 7 (Second unit) | 10 | 1 | 1 |
| 2 | 2 | 9 | 1 | 1 |
| 3 | 2 | 8 | 1 | 1 |
| 4 | 2 | 7 | 1 | 2 |
| 5 | 2 | 6 | 1 | 2 |
| 6 | 2 | 5 | 1 | 2 |
| 7 | 2 | 4 | 1 | 2 |
| 8 | 2 | 3 | 1 | 3 |
| 9 | 2 | 2 | 1 | 3 |
| 10 | 2 | 1 | 1 | 3 |
| 11 | 2 | 0 | 1 | 3 |
| 12 | 7 (First unit) | 11 | 1 | 1 |
| 13 | 7 (Second unit) | 10 | 1 | 2 |
| 14 | 2 | 9 | 1 | 3 |
| 15 | 2 | 8 | 1 | 1 |
| 16 | 2 | 7 | 1 | 2 |
| 17 | 2 | 6 | 1 | 3 |
| 18 | 2 | 5 | 1 | 1 |
| 19 | 2 | 4 | 1 | 2 |
| 20 | 2 | 3 | 1 | 3 |
| 21 | 2 | 2 | 1 | 1 |
| 22 | 2 | 1 | 1 | 2 |
| 23 | 2 | 0 | 1 | 3 |

The above table is an example, and other indication manners are not excluded.

In an embodiment, when the value T of the fourth indication field is 0 to 9 or is greater than 12 to 21, the value of the PDSCH scheduling delay is 2; when T is 10 or 22, the value of the PDSCH scheduling delay is 7 and corresponds to the first unit; and when T is 11 or 23, the value of the PDSCH scheduling delay is 7 and corresponds to the second unit.

When T is one of 0 to 3, 12, 15, 18 or 21, n8 is 3; when T is one of 4 to 7, 13, 16, 19 or 22, n8 is 2; and when T is one of 8 to 11, 14, 17, 20 or 23, n8 is equal to 1, n5 is equal to mod(T, 12), and n6 is equal to 1.

In an example embodiment, for the RedCap UE, if a PDCCH is detected on slot p and the corresponding DCI is DCI format1_1, the UE determines the slot where the HARQ-ACK transmission is located according to a PDSCH-to-HARQ-timing-indication field in the DCI and transmits an HARQ-ACK, where the value indicated by the PDSCH-to-HARQ-timing-indication field is shown in Table 13.

TABLE 13

| PDSCH-to-HARQ-timing-indication field | | | |
|---|---|---|---|
| 1 bit | 2 bits | 3 bits | Number k of slots |
| '0' | '00' | '000' | 1$^{st}$ value provided by dl-DataToUL-ACK |
| '1' | '01' | '001' | 2$^{nd}$ value provided by dl-DataToUL-ACK |
| | '10' | '010' | 3$^{rd}$ value provided by dl-DataToUL-ACK |
| | '11' | '011' | 4$^{th}$ value provided by dl-DataToUL-ACK |

TABLE 13-continued

| PDSCH-to-HARQ-timing-indication field | | | |
|---|---|---|---|
| 1 bit | 2 bits | 3 bits | Number k of slots |
| | | '100' | $5^{th}$ value provided by dl-DataToUL-ACK |
| | | '101' | $6^{th}$ value provided by dl-DataToUL-ACK |
| | | '110' | $7^{th}$ value provided by dl-DataToUL-ACK |
| | | '111' | $8^{th}$ value provided by dl-DataToUL-ACK |

Dl-DataToUL-ACK is higher-layer signaling with the minimum value of 1, or Dl-DataToUL-ACK ranges from 1 to 15, or Dl-DataToUL-ACK ranges from 1 to 16.

In an example embodiment, for the RedCap UE, if the PDCCH is detected on slot p, the UE transmits a PUSCH on slot p+k2, where the value of k2 is determined according to the higher-layer signaling and a time domain resource allocation field in the DCI. The time domain resource allocation field indicates a resource index, and the corresponding resource is determined through higher-layer signaling pusch-TimeFieldAllocationList, where the minimum value of k2 in PUSCH-TimeFieldResourceAllocation is 1, k2 ranges from 1 to 32, or k2 ranges from 1 to 33.

In an example embodiment, for the RedCap UE, if a random access response (RAR) PDCCH is detected on slot p, the UE transmits a PUSCH on slot p+K2+$\Delta$, where the value of K2 is determined through a time domain resource allocation field in the DCI and a preset first table, and the value of $\Delta$ is determined according to a subcarrier spacing and a preset second table. The time domain resource allocation field indicates a resource index, and the corresponding resource is determined through the preset first table, as shown in Table 14 and Table 15.

TABLE 14

| | Preset first table | | | |
|---|---|---|---|---|
| Row index | PUSCH mapping type | K2 | S | L |
| 1 | Type A | j | 0 | 14 |
| 2 | Type A | j | 0 | 12 |
| 3 | Type A | j | 0 | 10 |
| 4 | Type B | j | 2 | 10 |
| 5 | Type B | j | 4 | 10 |
| 6 | Type B | j | 4 | 8 |
| 7 | Type B | j | 4 | 6 |
| 8 | Type A | j + 1 | 0 | 14 |
| 9 | Type A | j + 1 | 0 | 12 |
| 10 | Type A | j + 1 | 0 | 10 |
| 11 | Type A | j + 2 | 0 | 14 |
| 12 | Type A | j + 2 | 0 | 12 |
| 13 | Type A | j + 2 | 0 | 10 |
| 14 | Type B | j | 8 | 6 |
| 15 | Type A | j + 3 | 0 | 14 |
| 16 | Type A | j + 3 | 0 | 10 |

TABLE 15

| Value of j | |
|---|---|
| $\mu_{PUSCH}$ | j |
| 0 | 1 |
| 1 | 1 |
| 2 | 2 |
| 3 | 3 |

The value of $\Delta$ determined according to the subcarrier spacing and a preset table.

For the RedCap UE, the minimum delay requirement after the processing delay is relaxed and K2+$\Delta$ after the processing delay requirement is satisfied are shown in Table 16.

Table 16

| $\mu_{PUSCH}$ | Minimum delay requirement (after relaxing) | K2 + $\Delta$ |
|---|---|---|
| 0 | 43 symbols | 56 symbols |
| 1 | 58 symbols | 70 symbols |
| 2 | 108 symbols | 112 symbols |
| 3 | 168 symbols | 168 symbols |

Therefore, the value of $\Delta$ is shown in Table 17.

TABLE 17

| Preset second table | |
|---|---|
| $\mu_{PUSCH}$ | $\Delta$ |
| 0 | 3 |
| 1 | 4 |
| 2 | 6 |
| 3 | 9 |

In an embodiment, the embodiments of the present application provide an information determination apparatus. The information determination apparatus is suitable for the case of determining a PDSCH scheduling delay. The information determination apparatus may be implemented by software and/or hardware. The apparatus is applied to a first node.

As shown in FIG. 6, the information determination apparatus provided by the embodiments of the present application mainly includes a detection module 61 and a determination module 62.

The detection module 61 is configured to detect an MPDCCH on a first subframe, where the MPDCCH carries DCI, and the DCI includes a signaling field indicating a value of a PDSCH scheduling delay. The determination module 62 is configured to determine a second subframe of PDSCH transmission based on the value of the PDSCH scheduling delay.

In an embodiment, the value of the PDSCH scheduling delay includes a first value and a second value, where the second value includes a first unit and a second unit.

In an embodiment, the second subframe of the PDSCH transmission is determined based on the value of the PDSCH scheduling delay in one or more of the following manners: if the MPDCCH is detected on a third subframe, the second subframe of the PDSCH transmission is determined according to the first unit corresponding to the value of the PDSCH scheduling delay; or if the MPDCCH is not detected on the third subframe, the second subframe of the PDSCH transmission is determined according to the second unit corresponding to the value of the PDSCH scheduling delay; where the third subframe is the $1^{st}$ valid downlink subframe after the first subframe.

In an embodiment, the second subframe of the PDSCH transmission is determined based on the value of the PDSCH scheduling delay in one of the following manners: if the MPDCCH is detected on a third subframe, the second subframe of the PDSCH transmission is determined according to the first unit corresponding to the value of the PDSCH scheduling delay; or if the MPDCCH is not detected on the third subframe, the second subframe of the PDSCH transmission is determined according to the second unit corresponding to the value of the PDSCH scheduling delay; where the third subframe is the $1^{st}$ valid downlink subframe after the first subframe.

In an embodiment, the second subframe of the PDSCH transmission is determined based on the value of the PDSCH scheduling delay in one or more of the following manners: when an HARQ process index indicated in the DCI is a first predefined value, the second subframe of the PDSCH transmission is determined according to the first unit corresponding to the value of the PDSCH scheduling delay; when the HARQ process index indicated in the DCI is a second predefined value, the second subframe of the PDSCH transmission is determined according to the second unit corresponding to the value of the PDSCH scheduling delay; when a value of an HARQ-ACK delay indicated in the DCI is greater than or equal to a third number, the second subframe of the PDSCH transmission is determined according to the first unit corresponding to the value of the PDSCH scheduling delay; or when the value of the HARQ-ACK delay indicated in the DCI is less than the third number, the second subframe of the PDSCH transmission is determined according to the second unit corresponding to the value of the PDSCH scheduling delay.

In an embodiment, the case where the DCI includes the signaling field indicating the value of the PDSCH scheduling delay includes a first signaling field in the DCI indicating the value of the PDSCH scheduling delay, where the first signaling field is a signaling field indicating the number of PDSCH repetitions, or the first signaling field is a newly added signaling field.

In an embodiment, the DCI further includes one or more signaling fields indicating a value of an HARQ-ACK feedback delay; and the method further includes that a fifth subframe for transmitting HARQ-ACK response information is determined based on the value of the HARQ-ACK feedback delay.

In an embodiment, the value of the HARQ-ACK feedback delay is determined through an HARQ-ACK feedback delay signaling field and a second signaling field in the DCI.

In an embodiment, the second signaling field is used for indicating the number of invalid subframes between a PDSCH and a corresponding HARQ; or the second signaling field is used for indicating a predetermined value; or the second signaling field is used for indicating a value configured by higher-layer signaling.

In an embodiment, the value of the PDSCH scheduling delay and the value of the HARQ-ACK feedback delay are determined through a PDSCH repetition number signaling field and an HARQ-ACK feedback delay signaling field in the DCI.

In an embodiment, the value of the PDSCH scheduling delay and the value of the HARQ-ACK feedback delay are determined through a third signaling field and an HARQ-ACK feedback delay signaling field in the DCI, where when the third signaling field exists, the PDSCH repetition number signaling field occupies 0 bit.

In an embodiment, the fifth subframe is the Pt valid uplink subframe after the second subframe, a fourth number of valid downlink subframes, a fifth number of physical subframes and a sixth number of valid uplink subframes.

In an embodiment, the fourth number and the sixth number are determined through one or more signaling fields in the DCI, and the fifth number is a preset value.

In an embodiment, the value of the PDSCH scheduling delay, the fourth number and the sixth number are determined through one signaling field in the DCI, and the fifth number is a preset value.

In an embodiment, the fifth subframe is a seventh-number$^{th}$ valid uplink subframe after the second subframe, a fourth number of valid downlink subframes and a fifth number of physical subframes.

In an embodiment, the fourth number and the seventh number are determined through one or more signaling fields in the DCI, and the seventh number is a preset value.

In an embodiment, the value of the PDSCH scheduling delay, the fourth number and the seventh number are determined through one signaling field in the DCI, and the seventh number is a preset value.

In an embodiment, the second subframe determined according to the first unit corresponding to the value of the PDSCH scheduling delay includes: the $2^{nd}$ physical subframe after the first subframe, two physical subframes, and three valid uplink subframes; and the second subframe determined according to the second unit corresponding to the value of the PDSCH scheduling delay includes: the $3^{rd}$ physical subframe after the first subframe, one physical subframe and three valid uplink subframes.

In an embodiment, the second subframe determined according to the first unit corresponding to the value of the PDSCH scheduling delay includes: the $1^{st}$ valid downlink subframe after the first subframe, one valid downlink subframe, one physical subframe, three valid uplink subframes and one physical subframe; and the second subframe determined according to the second unit corresponding to the value of the PDSCH scheduling delay includes: the $2^{nd}$ valid downlink subframe after the first subframe, one physical subframe, three valid uplink subframes and one physical subframe.

The information determination apparatus provided in this embodiment may perform the information determination method provided in any embodiments of the present application and has function modules and effects corresponding to the performed method. For technical details that are not described in detail in this embodiment, reference may be made to the information determination method provided in any embodiments of the present application.

Units and modules included in the embodiment of the information determination apparatus are just divided according to the functional logic, but the present application is not limited to this division as long as the corresponding functions can be implemented. Additionally, the names of function units are just used to distinguish between each other and are not intended to limit the scope of the present application.

Figure 7:
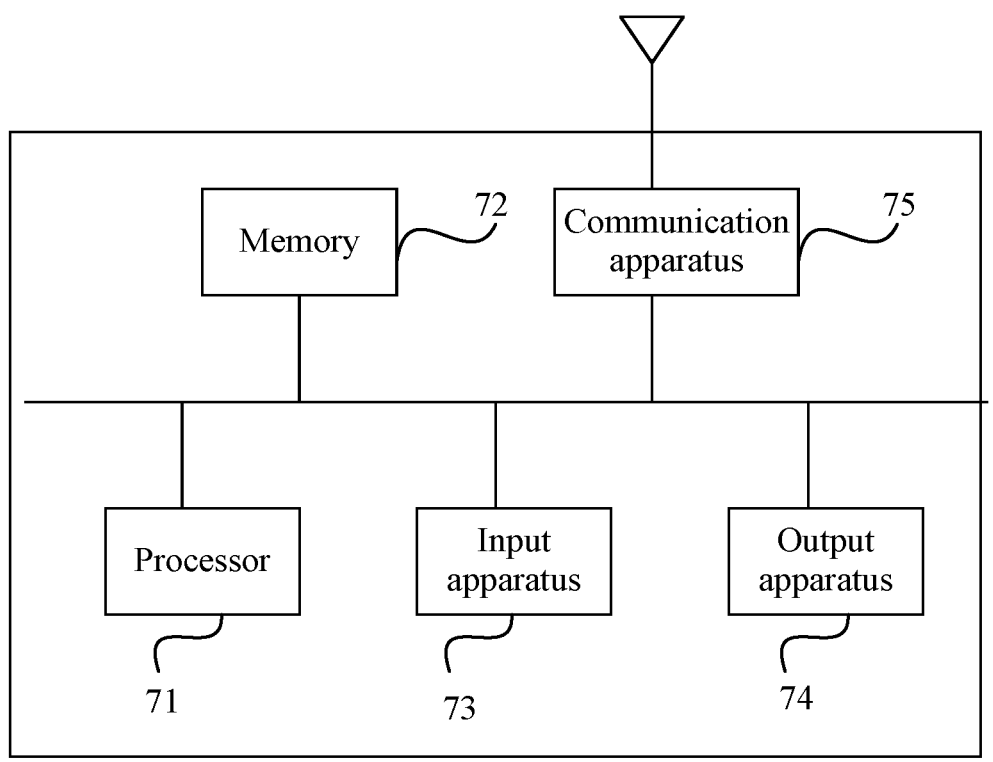
FIG. 7 is a structure diagram of a device according to an embodiment of the present application.

The embodiments of the present application further provide a device. FIG. 7 is a structure diagram of a device according to an embodiment of the present application. As shown in FIG. 7, the device includes a processor 71, a memory 72, an input apparatus 73, an output apparatus 74 and a communication apparatus 75. The number of processors 71 in the device may be one or more, and one processor 71 is illustrated in FIG. 7 as an example. The processor 71, the memory 71, the input apparatus 72 and the output apparatus 124 in the device may be connected to each other via a bus or in other ways, and the connection via a bus is illustrated in FIG. 7 as an example.

As a computer-readable storage medium, the memory 72 may be configured to store software programs, computer-executable programs and modules, for example, program instructions/modules corresponding to the information determination method in the embodiments of the present application. The processor 71 executes software programs, instructions, and modules stored in the memory 72 to perform various function applications and data processing of the device, that is, to implement any methods provided by the embodiments of the present application.

The memory 72 may mainly include a program storage region and a data storage region, where the program storage region may store an operating system and an application program required by at least one function while the data storage region may store data created depending on the use of the device. In addition, the memory 72 may include a high-speed random-access memory and may also include a non-volatile memory such as at least one disk memory, flash memory or another non-volatile solid-state memory. In some examples, the memory 72 may include memories which are remotely disposed with respect to the processor 71, and these remote memories may be connected to the device via a network. Examples of the preceding network include, but are not limited to, the Internet, an intranet, a local area network, a mobile communication network and combinations thereof.

The input apparatus 73 may be configured to receive input digital or character information and generate key signal input related to the user setting and function control of the device. The output apparatus 74 may include a display device such as a display screen.

The communication apparatus 75 may include a receiver and a transmitter. The communication apparatus 75 is configured to perform information transceiving and communication under the control of the processor 71.

In an example embodiment, the embodiments of the present application further provide a storage medium including computer-executable instructions, where the computer-executable instructions are configured to, when executed by a computer processor, perform an information determination method. The method includes the following operations.

An MPDCCH is detected on a first subframe, where the MPDCCH carries DCI, and the DCI includes a signaling field indicating a value of a PDSCH scheduling delay; and a second subframe of PDSCH transmission is determined based on the value of the PDSCH scheduling delay.

As for the storage medium including the computer-executable instruction, which is provided in the embodiments of the present application, the computer-executable instruction may implement not only the operation in the preceding method but also the related operations in the information determination method provided in any embodiments of the present application.

From the preceding description of the embodiments, the present application may be implemented by means of both software and required general-purpose hardware, and also by means of hardware. The technical solutions of the present application may be essentially embodied in the form of a software product. The computer software product may be stored in a computer-readable storage medium such as a floppy disk, a read-only memory (ROM), a random-access memory (RAM), a flash memory, a hard disk, or an optical disk of a computer and includes multiple instructions for causing a computer device (which may be a personal computer, a server or a network device) to perform the method in any embodiments of the present application.

The above are only example embodiments of the present application.

It is to be understood by those skilled in the art that the term user terminal encompasses any suitable type of wireless user device, for example, a mobile phone, a portable data processing apparatus, a portable web browser, or a vehicle-mounted mobile station.

Generally speaking, the various embodiments of the present application may be implemented in hardware or special-purpose circuits, software, logic or any combination thereof. For example, some aspects may be implemented in hardware while other aspects may be implemented in firmware or software executable by a controller, a microprocessor or another calculation apparatus, though the present application is not limited thereto.

Embodiments of the present application may be implemented through the execution of computer program instructions by a data processor of a mobile apparatus, for example, implemented in a processor entity, by hardware, or by a combination of software and hardware. The computer program instructions may be assembly instructions, instruction set architecture (ISA) instructions, machine instructions, machine-related instructions, microcodes, firmware instructions, status setting data, or source or object codes written in any combination of one or more programming languages.

A block diagram of any logic flow among the drawings of the present application may represent program steps, may represent interconnected logic circuits, modules, and functions, or may represent a combination thereof. Computer programs may be stored on the memory. The memory may be of any type suitable for a local technical environment and may be implemented using any suitable data storage technology, for example, but not limited to, a read-only memory (ROM), a random-access memory (RAM), and an optical memory device and system (a digital video disc (DVD) or a compact disk (CD)). Computer-readable media may include non-transitory storage media. The data processor may be of any type suitable to the local technical environment such as, but not limited to, a general-purpose computer, a special-purpose computer, a microprocessor, digital signal processing (DSP), an application-specific integrated circuit (ASIC), a field-programmable gate array (FPGA) and a processor based on a multi-core processor architecture.

What is claimed is:

1. An information determination method, being applied to a first node and comprising:
    detecting a machine-type communication physical downlink control channel (MPDCCH) on a first subframe, wherein the MPDCCH carries downlink control information (DCI), and the DCI comprises a signaling field indicating a value of a physical downlink shared channel (PDSCH) scheduling delay; and
    determining a second subframe of PDSCH transmission based on the value of the PDSCH scheduling delay;
    wherein determining the second subframe of the PDSCH transmission based on the value of the PDSCH scheduling delay comprises at least one of:
    in response to a number of valid downlink subframes between the first subframe and a fourth subframe being a first number, determining the second subframe of the PDSCH transmission according to a first unit corresponding to the value of the PDSCH scheduling delay;
    in response to a number of valid downlink subframes between the first subframe and a fourth subframe being a second number, determining the second subframe of the PDSCH transmission according to a second unit corresponding to the value of the PDSCH scheduling delay;
    in response to a hybrid automatic repeat request (HARQ) process index indicated in the DCI being a first predefined value, determining the second subframe of the PDSCH transmission according to a first unit corresponding to the value of the PDSCH scheduling delay;
in response to an HARQ process index indicated in the DCI being a second predefined value, determining the second subframe of the PDSCH transmission according to a second unit corresponding to the value of the PDSCH scheduling delay;
in response to a value of a hybrid automatic repeat request acknowledgement (HARQ-ACK) delay indicated in the DCI being greater than or equal to a third number, determining the second subframe of the PDSCH transmission according to a first unit corresponding to the value of the PDSCH scheduling delay;
in response to a value of an HARQ-ACK delay indicated in the DCI being less than a third number, determining the second subframe of the PDSCH transmission according to a second unit corresponding to the value of the PDSCH scheduling delay;
determining the second subframe according to a first unit corresponding to the value of the PDSCH scheduling delay; or
determining the second subframe according to a second unit corresponding to the value of the PDSCH scheduling delay;
wherein the fourth subframe is a 1st downlink-to-uplink transition subframe after the first subframe;
wherein the second subframe determined according to the first unit corresponding to the value of the PDSCH scheduling delay comprises: a 2nd physical subframe after the first subframe, two physical subframes and three valid uplink subframes; and the second subframe determined according to the second unit corresponding to the value of the PDSCH scheduling delay comprises: a 3rd physical subframe after the first subframe, one physical subframe and three valid uplink subframes; or
wherein the second subframe determined according to the first unit corresponding to the value of the PDSCH scheduling delay comprises: a 1st valid downlink subframe after the first subframe, one valid downlink subframe, one physical subframe, three valid uplink subframes and one physical subframe; and the second subframe determined according to the second unit corresponding to the value of the PDSCH scheduling delay comprises: a 2nd valid downlink subframe after the first subframe, one physical subframe, three valid uplink subframes and one physical subframe.

2. The information determination method of claim 1, wherein the value of the PDSCH scheduling delay comprises a first value and a second value, wherein the second value comprises a first unit and a second unit.

3. The information determination method of claim 1, wherein determining the second subframe of the PDSCH transmission based on the value of the PDSCH scheduling delay further comprises at least one of:
in response to the MPDCCH being detected on a third subframe, determining the second subframe of the PDSCH transmission according to a first unit corresponding to the value of the PDSCH scheduling delay; or
in response to the MPDCCH not being detected on a third subframe, determining the second subframe of the PDSCH transmission according to a second unit corresponding to the value of the PDSCH scheduling delay;
wherein the third subframe is a 1st valid downlink subframe after the first subframe.

4. The information determination method of claim 1, wherein the DCI comprising the signaling field indicating the value of the PDSCH scheduling delay comprises:
a first signaling field in the DCI indicating the value of the PDSCH scheduling delay;
wherein the first signaling field is a signaling field indicating a number of PDSCH repetitions, or the first signaling field is a newly added signaling field, or in response to the first signaling field existing, the first signaling field indicates that a signaling field of a number of PDSCH repetitions occupies 0 bit.

5. The information determination method of claim 1, wherein the DCI further comprises at least one signaling field indicating a value of an HARQ-ACK feedback delay; and
the method further comprises:
determining a fifth subframe for transmitting HARQ-ACK response information based on the value of the HARQ-ACK feedback delay.

6. The information determination method of claim 5, wherein the value of the HARQ-ACK feedback delay is determined through an HARQ-ACK feedback delay signaling field in the DCI and a second signaling field in the DCI;
wherein the second signaling field is used for indicating a number of invalid subframes between a PDSCH and an HARQ corresponding to the PDSCH; or the second signaling field is used for indicating a predetermined value; or the second signaling field is used for indicating a value configured by higher-layer signaling.

7. The information determination method of claim 5, wherein the value of the PDSCH scheduling delay and the value of the HARQ-ACK feedback delay are determined through a PDSCH repetition number signaling field in the DCI and an HARQ-ACK feedback delay signaling field in the DCI.

8. The information determination method of claim 5, wherein the value of the PDSCH scheduling delay and the value of the HARQ-ACK feedback delay are determined through a third signaling field in the DCI and an HARQ-ACK feedback delay signaling field in the DCI, wherein in response to the third signaling field existing, a PDSCH repetition number signaling field occupies 0 bit.

9. The information determination method of claim 5, wherein the fifth subframe is a 1st valid uplink subframe after the second subframe, a fourth number of valid downlink subframes, a fifth number of physical subframes and a sixth number of valid uplink subframes.

10. The information determination method of claim 9, wherein the fourth number and the sixth number are determined through at least one signaling field in the DCI, and the fifth number is a preset value.

11. The information determination method of claim 9, wherein the value of the PDSCH scheduling delay, the fourth number and the sixth number are determined through one signaling field in the DCI, and the fifth number is a preset value.

12. The information determination method of claim 5, wherein the fifth subframe is a seventh-numberth valid uplink subframe after the second subframe, a fourth number of valid downlink subframes and a fifth number of physical subframes.

13. The information determination method of claim 12, wherein the fourth number and the seventh number are determined through at least one signaling field in the DCI, and the fifth number is a preset value; or wherein the value of the PDSCH scheduling delay, the fourth number and the seventh number are determined through one signaling field in the DCI, and the fifth number is a preset value.

14. A non-transitory storage medium storing a computer program, wherein the computer program, when executed by a processor, performs an information determination method, wherein the information determination method comprises:
detecting a machine-type communication physical downlink control channel (MPDCCH) on a first subframe, wherein the MPDCCH carries downlink control information (DCI), and the DCI comprises a signaling field indicating a value of a physical downlink shared channel (PDSCH) scheduling delay; and
determining a second subframe of PDSCH transmission based on the value of the PDSCH scheduling delay;
wherein determining the second subframe of the PDSCH transmission based on the value of the PDSCH scheduling delay comprises at least one of:
in response to a number of valid downlink subframes between the first subframe and a fourth subframe being a first number, determining the second subframe of the PDSCH transmission according to a first unit corresponding to the value of the PDSCH scheduling delay;
in response to a number of valid downlink subframes between the first subframe and a fourth subframe being a second number, determining the second subframe of the PDSCH transmission according to a second unit corresponding to the value of the PDSCH scheduling delay;
in response to a hybrid automatic repeat request (HARQ) process index indicated in the DCI being a first predefined value, determining the second subframe of the PDSCH transmission according to a first unit corresponding to the value of the PDSCH scheduling delay;
in response to an HARQ process index indicated in the DCI being a second predefined value, determining the second subframe of the PDSCH transmission according to a second unit corresponding to the value of the PDSCH scheduling delay;
in response to a value of a hybrid automatic repeat request acknowledgement (HARQ-ACK) delay indicated in the DCI being greater than or equal to a third number, determining the second subframe of the PDSCH transmission according to a first unit corresponding to the value of the PDSCH scheduling delay;
in response to a value of an HARQ-ACK delay indicated in the DCI being less than a third number, determining the second subframe of the PDSCH transmission according to a second unit corresponding to the value of the PDSCH scheduling delay;
determining the second subframe according to a first unit corresponding to the value of the PDSCH scheduling delay; or
determining the second subframe according to a second unit corresponding to the value of the PDSCH scheduling delay;
wherein the fourth subframe is a 1st downlink-to-uplink transition subframe after the first subframe;
wherein the second subframe determined according to the first unit corresponding to the value of the PDSCH scheduling delay comprises: a 2nd physical subframe after the first subframe, two physical subframes and three valid uplink subframes; and the second subframe determined according to the second unit corresponding to the value of the PDSCH scheduling delay comprises: a 3rd physical subframe after the first subframe, one physical subframe and three valid uplink subframes; or
wherein the second subframe determined according to the first unit corresponding to the value of the PDSCH scheduling delay comprises: a 1st valid downlink subframe after the first subframe, one valid downlink subframe, one physical subframe, three valid uplink subframes and one physical subframe; and the second subframe determined according to the second unit corresponding to the value of the PDSCH scheduling delay comprises: a 2nd valid downlink subframe after the first subframe, one physical subframe, three valid uplink subframes and one physical subframe.

15. A device, comprising:
at least one processor; and
a memory configured to store at least one program;
wherein the at least one program, when executed by the at least one processor, causes the at least one processor to perform an information determination method, wherein the information determination method comprises:
detecting a machine-type communication physical downlink control channel (MPDCCH) on a first subframe, wherein the MPDCCH carries downlink control information (DCI), and the DCI comprises a signaling field indicating a value of a physical downlink shared channel (PDSCH) scheduling delay; and
determining a second subframe of PDSCH transmission based on the value of the PDSCH scheduling delay;
wherein determining the second subframe of the PDSCH transmission based on the value of the PDSCH scheduling delay comprises at least one of:
in response to a number of valid downlink subframes between the first subframe and a fourth subframe being a first number, determining the second subframe of the PDSCH transmission according to a first unit corresponding to the value of the PDSCH scheduling delay;
in response to a number of valid downlink subframes between the first subframe and a fourth subframe being a second number, determining the second subframe of the PDSCH transmission according to a second unit corresponding to the value of the PDSCH scheduling delay;
in response to a hybrid automatic repeat request (HARQ) process index indicated in the DCI being a first predefined value, determining the second subframe of the PDSCH transmission according to a first unit corresponding to the value of the PDSCH scheduling delay;
in response to an HARQ process index indicated in the DCI being a second predefined value, determining the second subframe of the PDSCH transmission according to a second unit corresponding to the value of the PDSCH scheduling delay;
in response to a value of a hybrid automatic repeat request acknowledgement (HARQ-ACK) delay indicated in the DCI being greater than or equal to a third number, determining the second subframe of the PDSCH transmission according to a first unit corresponding to the value of the PDSCH scheduling delay;
in response to a value of an HARQ-ACK delay indicated in the DCI being less than a third number, determining the second subframe of the PDSCH transmission according to a second unit corresponding to the value of the PDSCH scheduling delay;
determining the second subframe according to a first unit corresponding to the value of the PDSCH scheduling delay; or determining the second subframe according to a second unit corresponding to the value of the PDSCH scheduling delay;

wherein the fourth subframe is a 1st downlink-to-uplink transition subframe after the first subframe;

wherein the second subframe determined according to the first unit corresponding to the value of the PDSCH scheduling delay comprises: a 2nd physical subframe after the first subframe, two physical subframes and three valid uplink subframes; and the second subframe determined according to the second unit corresponding to the value of the PDSCH scheduling delay comprises: a 3rd physical subframe after the first subframe, one physical subframe and three valid uplink subframes; or wherein the second subframe determined according to the first unit corresponding to the value of the PDSCH scheduling delay comprises: a 1st valid downlink subframe after the first subframe, one valid downlink subframe, one physical subframe, three valid uplink subframes and one physical subframe; and the second subframe determined according to the second unit corresponding to the value of the PDSCH scheduling delay comprises: a 2nd valid downlink subframe after the first subframe, one physical subframe, three valid uplink subframes and one physical subframe.

16. The device of claim 15, wherein the value of the PDSCH scheduling delay comprises a first value and a second value, wherein the second value comprises a first unit and a second unit.

17. The device of claim 15, wherein determining the second subframe of the PDSCH transmission based on the value of the PDSCH scheduling delay further comprises at least one of:

in response to the MPDCCH being detected on a third subframe, determining the second subframe of the PDSCH transmission according to a first unit corresponding to the value of the PDSCH scheduling delay; or in response to the MPDCCH not being detected on a third subframe, determining the second subframe of the PDSCH transmission according to a second unit corresponding to the value of the PDSCH scheduling delay;

wherein the third subframe is a 1st valid downlink subframe after the first subframe.

18. The device of claim 15, wherein the DCI comprising the signaling field indicating the value of the PDSCH scheduling delay comprises:

a first signaling field in the DCI indicating the value of the PDSCH scheduling delay;

wherein the first signaling field is a signaling field indicating a number of PDSCH repetitions, or the first signaling field is a newly added signaling field, or in response to the first signaling field existing, the first signaling field indicates that a signaling field of a number of PDSCH repetitions occupies 0 bit.

19. The device of claim 15, wherein the DCI further comprises at least one signaling field indicating a value of an HARQ-ACK feedback delay; and the information determination method further comprises:

determining a fifth subframe for transmitting HARQ-ACK response information based on the value of the HARQ-ACK feedback delay.

20. The device of claim 19, wherein the value of the HARQ-ACK feedback delay is determined through an HARQ-ACK feedback delay signaling field in the DCI and a second signaling field in the DCI;

wherein the second signaling field is used for indicating a number of invalid subframes between a PDSCH and an HARQ corresponding to the PDSCH; or the second signaling field is used for indicating a predetermined value; or the second signaling field is used for indicating a value configured by higher-layer signaling.

* * * * *